Figure 1:
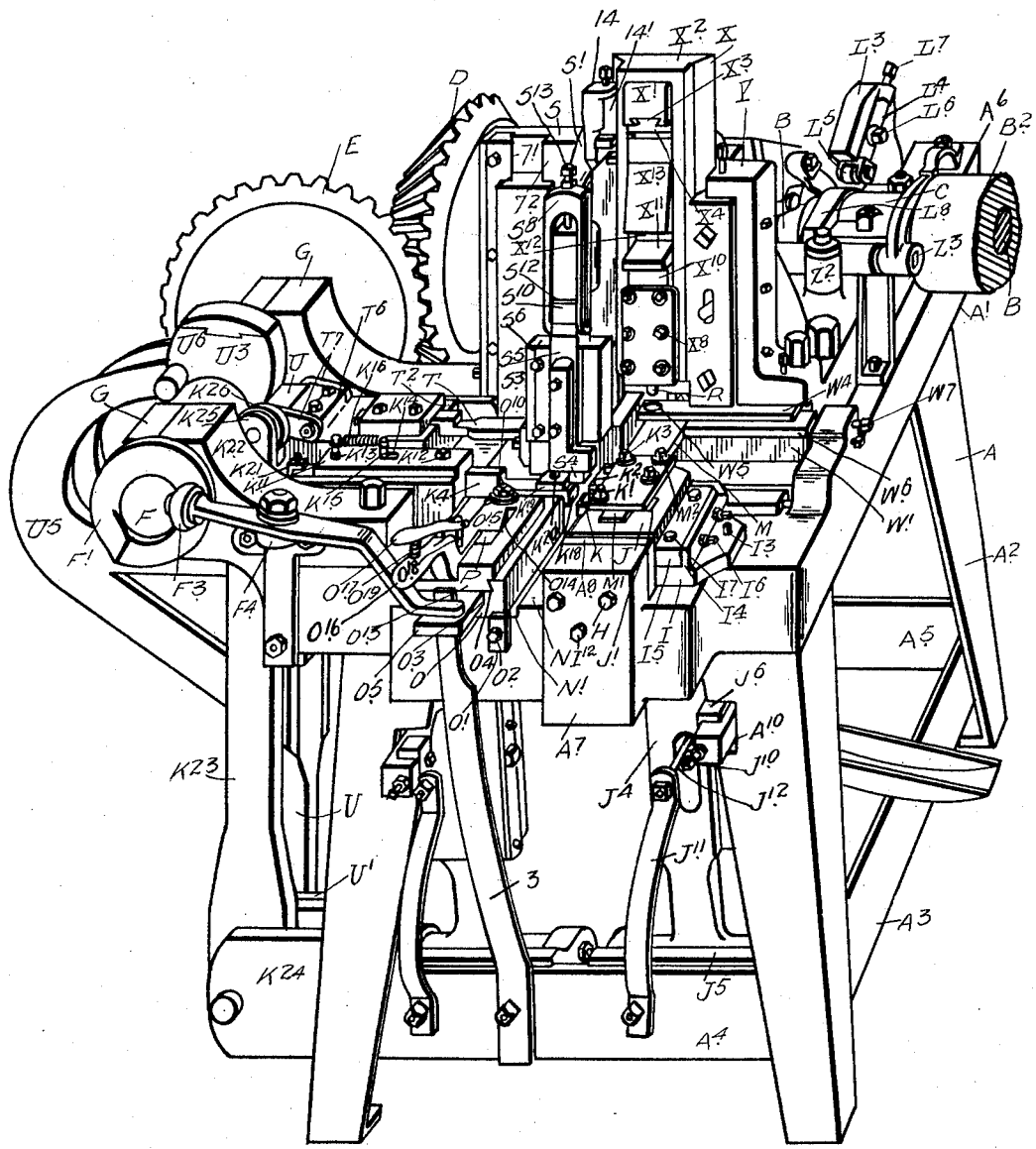

F. KELLY.
HOT PRESSED NUT MAKING MACHINE.
APPLICATION FILED FEB. 15, 1910.

1,002,702.

Patented Sept. 5, 1911.
14 SHEETS—SHEET 1.

WITNESSES

INVENTOR.
F. Kelly

F. KELLY.
HOT PRESSED NUT MAKING MACHINE.
APPLICATION FILED FEB. 15, 1910.

1,002,702.

Patented Sept. 5, 1911.
14 SHEETS—SHEET 3.

F. KELLY.
HOT PRESSED NUT MAKING MACHINE.
APPLICATION FILED FEB. 15, 1910.

1,002,702.

Patented Sept. 5, 1911.
14 SHEETS—SHEET 4.

WITNESSES.

INVENTOR.
F. Kelly

F. KELLY.
HOT PRESSED NUT MAKING MACHINE.
APPLICATION FILED FEB. 15, 1910.

1,002,702.

Patented Sept. 5, 1911.
14 SHEETS—SHEET 8.

WITNESSES:

INVENTOR.
F. Kelly
by Fred B. Fetherstonhaugh
Atty.

F. KELLY.
HOT PRESSED NUT MAKING MACHINE.
APPLICATION FILED FEB. 15, 1910.

1,002,702.

Patented Sept. 5, 1911.
14 SHEETS—SHEET 9.

WITNESSES

INVENTOR.
F. Kelly
by Lee B Featherstonaugh
ATTY.

F. KELLY.
HOT PRESSED NUT MAKING MACHINE.
APPLICATION FILED FEB. 15, 1910.

1,002,702.

Patented Sept. 5, 1911.
14 SHEETS—SHEET 11.

WITNESSES.

INVENTOR.

F. KELLY.
HOT PRESSED NUT MAKING MACHINE.
APPLICATION FILED FEB. 15, 1910.

1,002,702.

Patented Sept. 5, 1911.
14 SHEETS—SHEET 12.

WITNESSES.

INVENTOR.

F. KELLY.
HOT PRESSED NUT MAKING MACHINE.
APPLICATION FILED FEB. 15, 1910.

1,002,702.

Patented Sept. 5, 1911.
14 SHEETS—SHEET 13.

WITNESSES.
H. J. S. Young.
F. McCain.

INVENTOR.
F. KELLY.
by Fred B. Fetherstonhaugh
atty.

F. KELLY.
HOT PRESSED NUT MAKING MACHINE.
APPLICATION FILED FEB. 15, 1910.

1,002,702.

Patented Sept. 5, 1911.
14 SHEETS—SHEET 14.

WITNESSES

INVENTOR.

UNITED STATES PATENT OFFICE.

FREDERICK KELLY, OF TORONTO, ONTARIO, CANADA.

HOT-PRESSED-NUT-MAKING MACHINE.

1,002,702.   Specification of Letters Patent.   Patented Sept. 5, 1911.

Application filed February 15, 1910. Serial No. 544,073.

*To all whom it may concern:*

Be it known that I, FREDERICK KELLY, of the city of Toronto, in the county of York, in the Province of Ontario, Canada, have invented certain new and useful Improvements in Hot-Pressed-Nut-Making Machines, of which the following is the specification.

My invention relates to improvements in hot pressed nut making machines, and the object of the invention is—first—to devise a machine of this class in which the bar will be sized before it passes into the machine, and thus insure the perfect formation of the nut—secondly—to provide an improved feeding means, whereby the bar is carried forward under the shears preparatory to the formation of a nut—thirdly—to form a nut completely finished and thus dispense with the after finishing of a nut now commonly incident to machines of this class—fourthly—to deliver the shot, bur and the nut separately and therefore obviate the present necessity of sorting and thus dispense with a vast amount of labor and consequently greatly reduce the cost of operating the machine—fifthly—to so construct the machine as to reduce the wear and tear to a minimum on the tool and consequently reduce the repair on the same to a minimum and the cost of operating the machine and—seventhly—generally to greatly increase the capacity of the machine as compared with other machines of this class at present in use.

To effect these objects I have constructed my improved nut making machine in the manner, which I shall now presently describe and illustrate in the accompanying drawings forming part of this specification.

Figure 2:
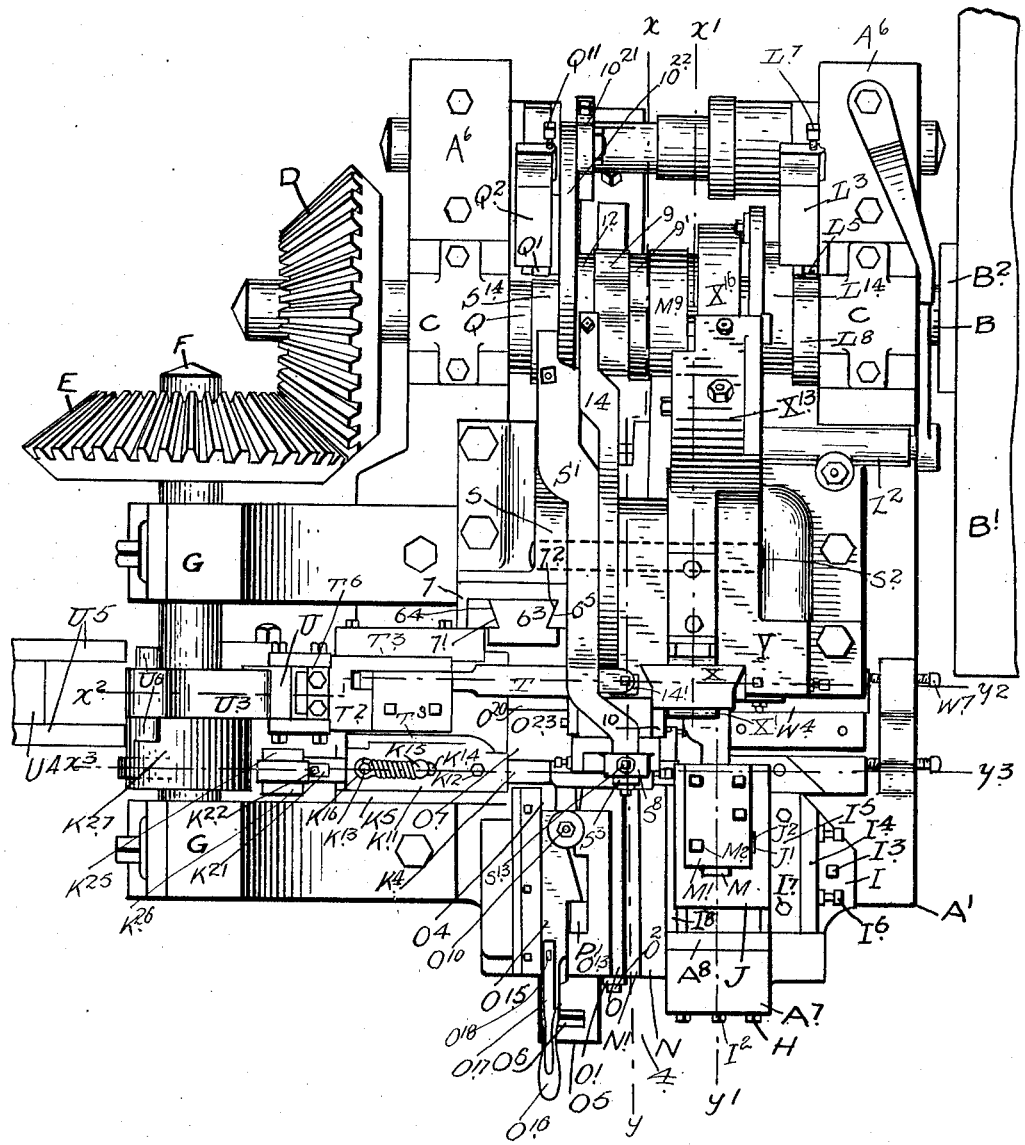
Figure 3:
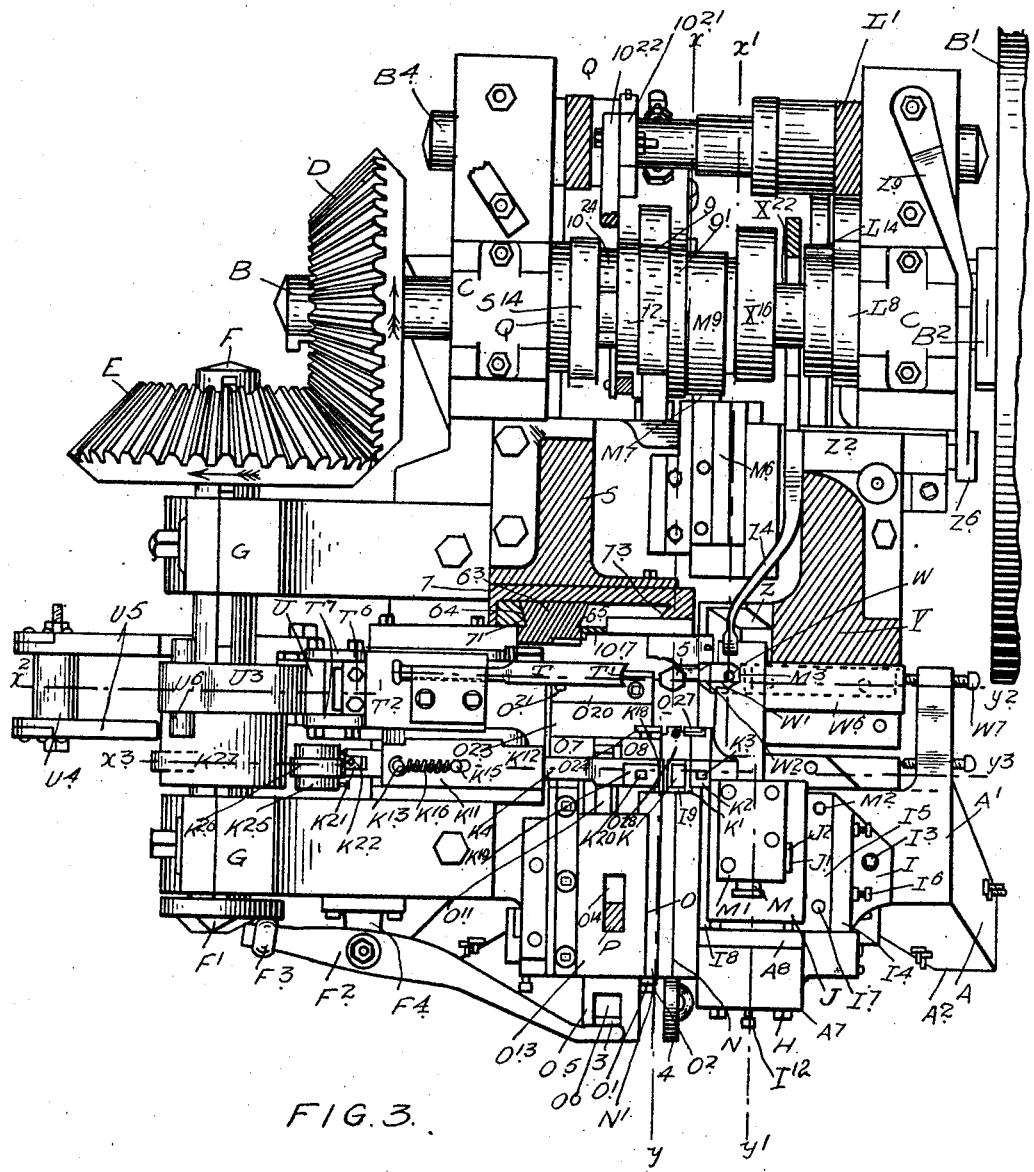
Figure 4:
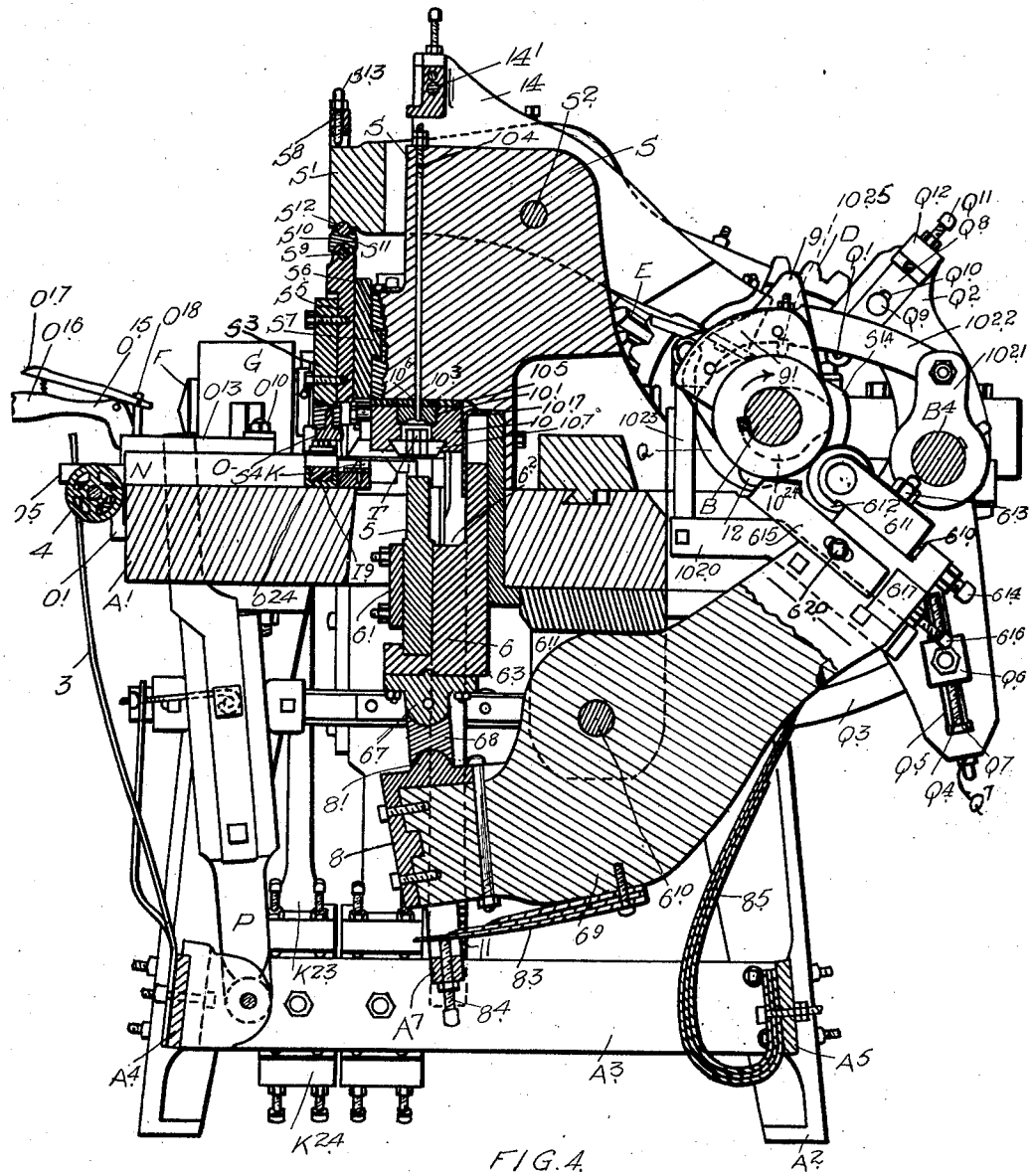
Figure 5:
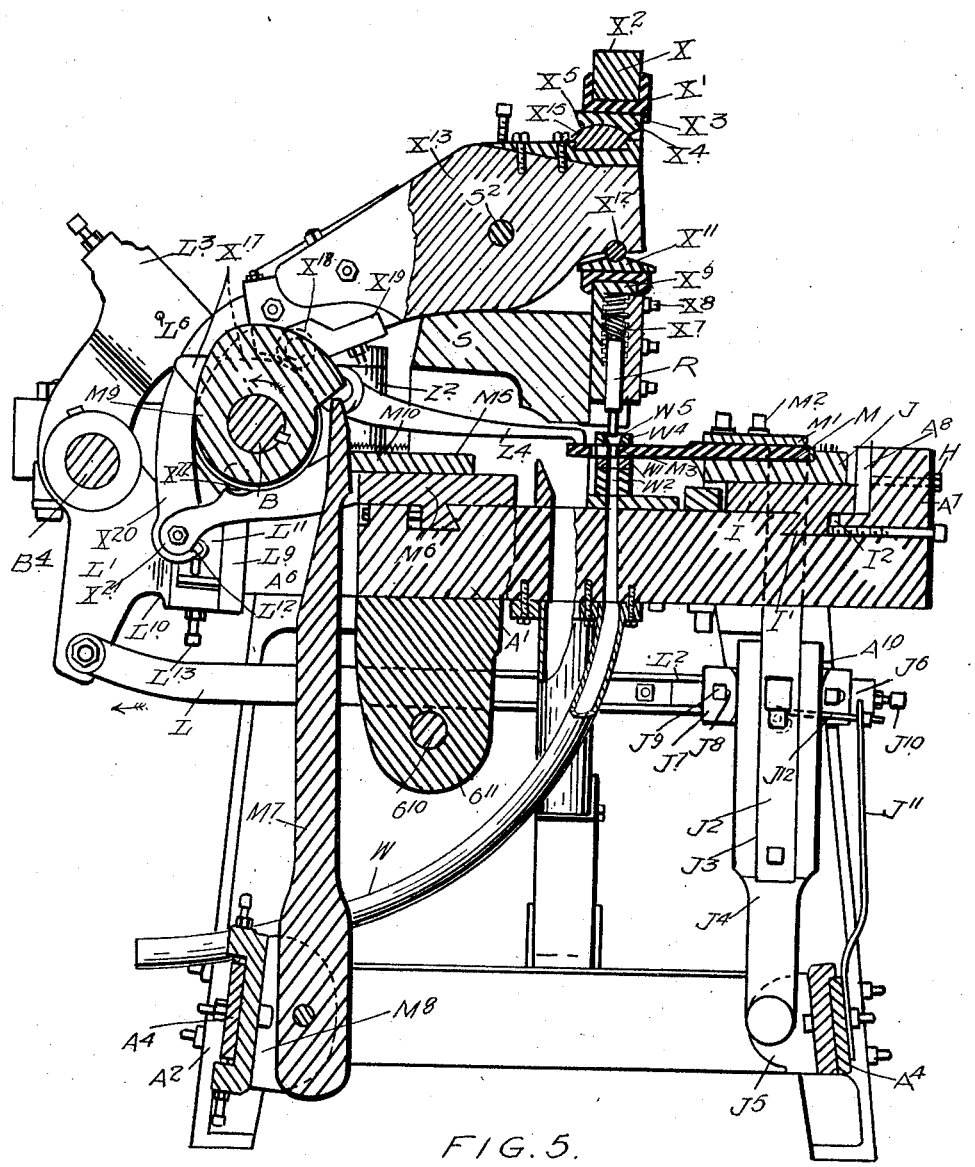
Figure 6:
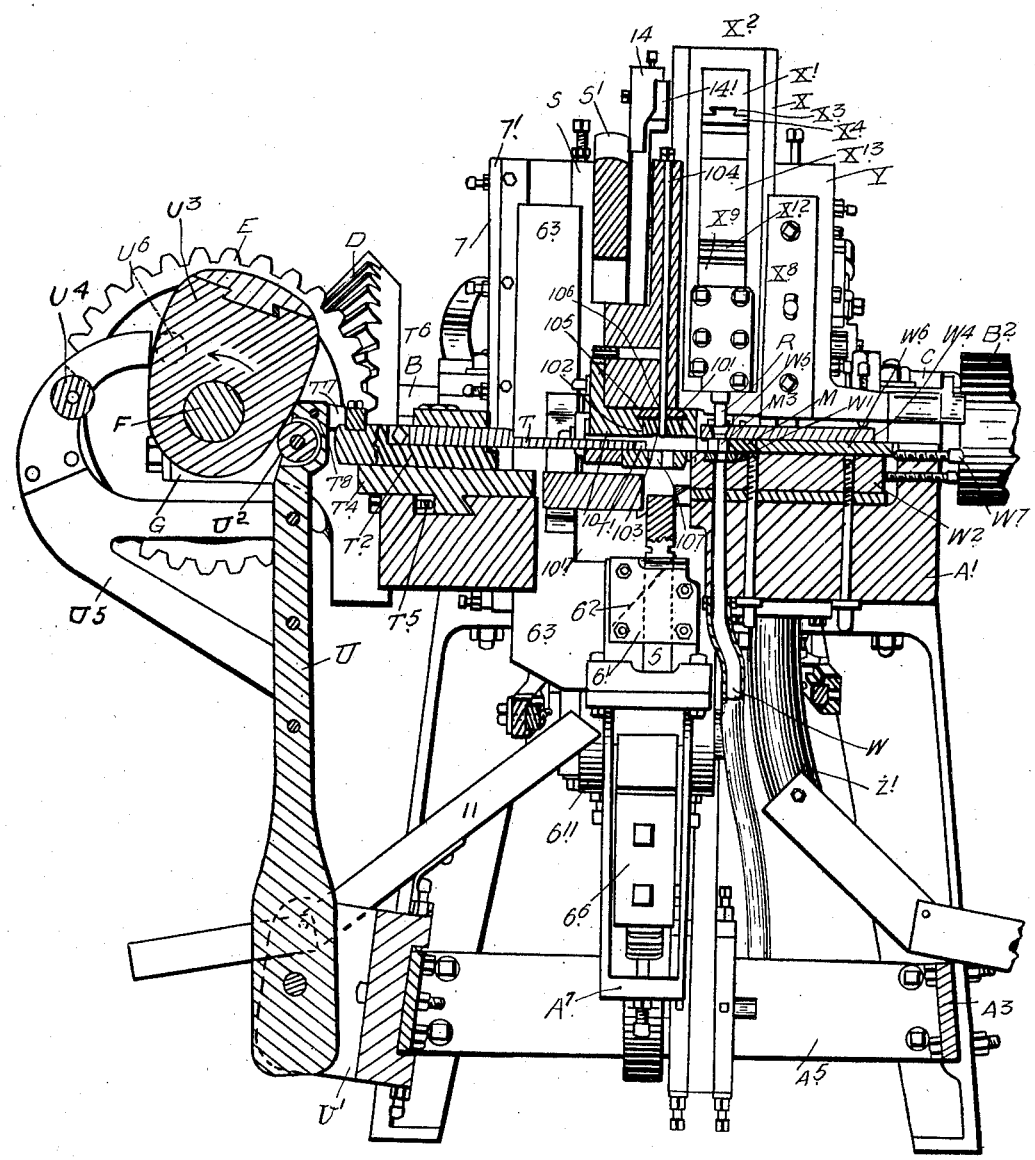
Figure 7:
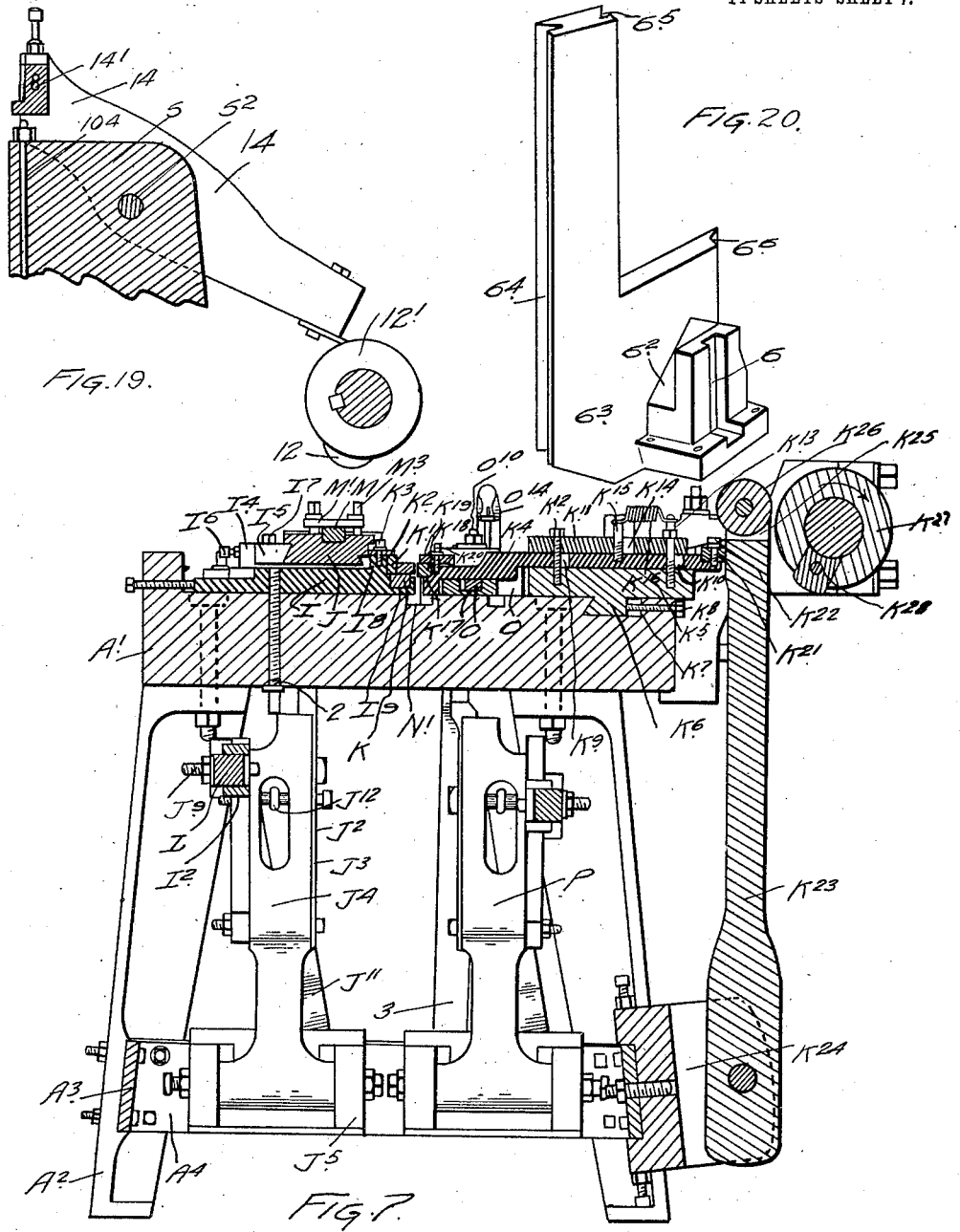
Figure 8:
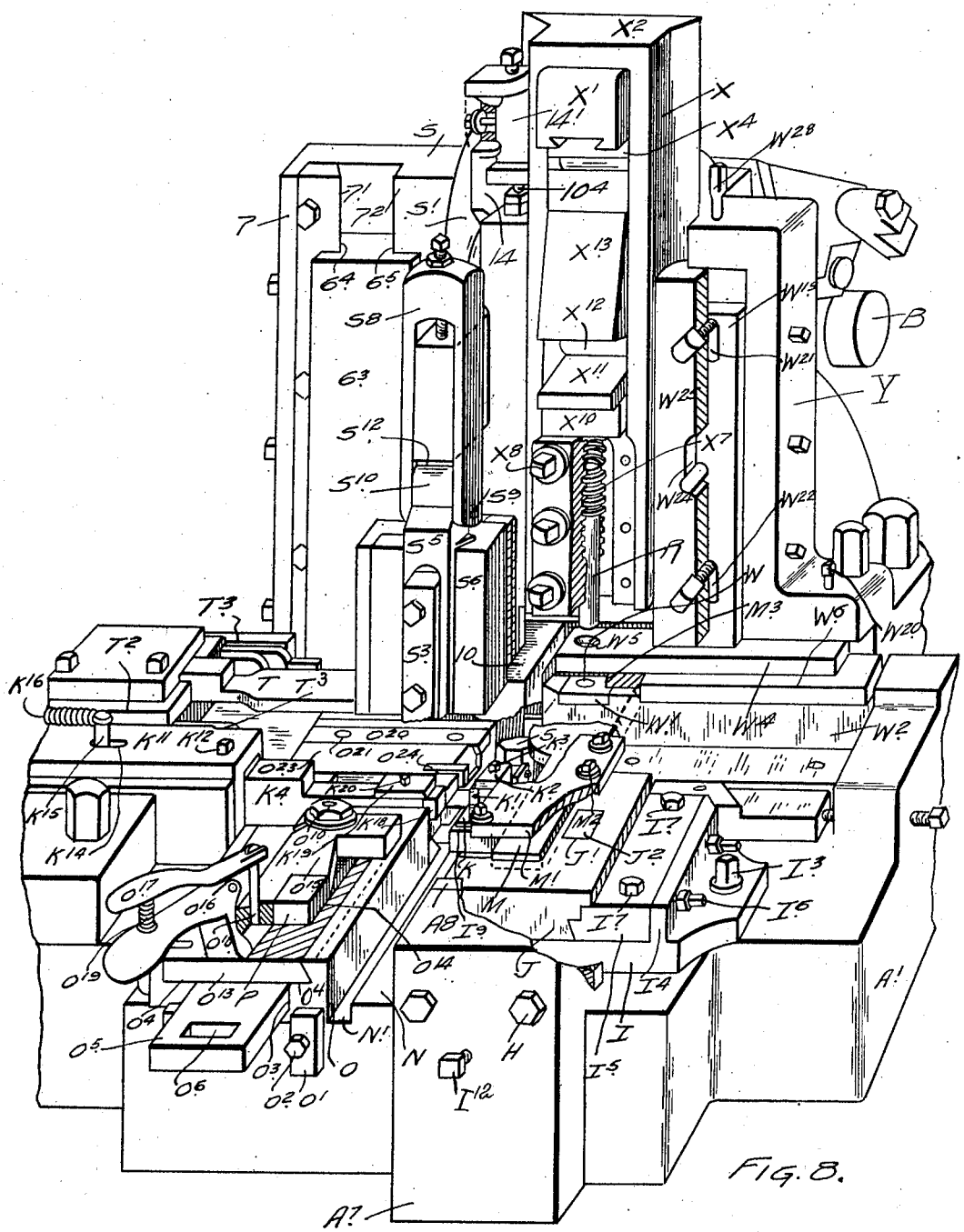
Figure 9:
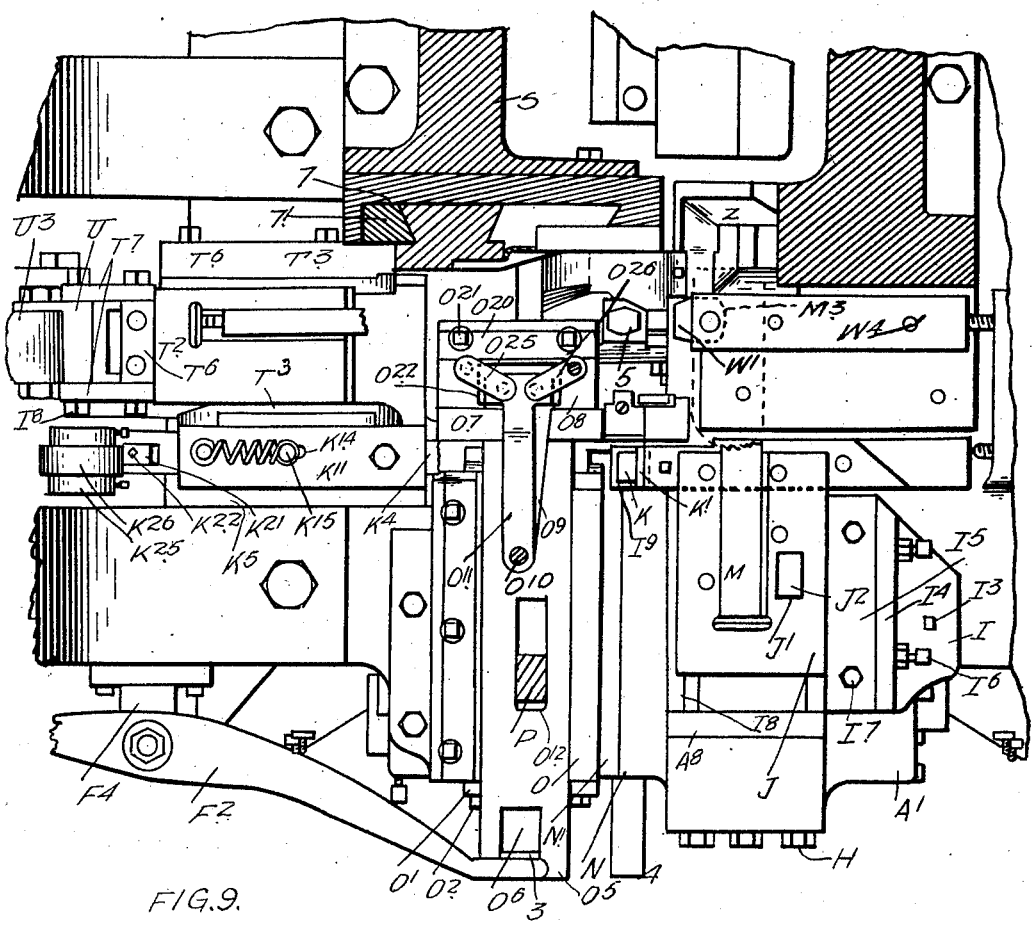
Figure 10:
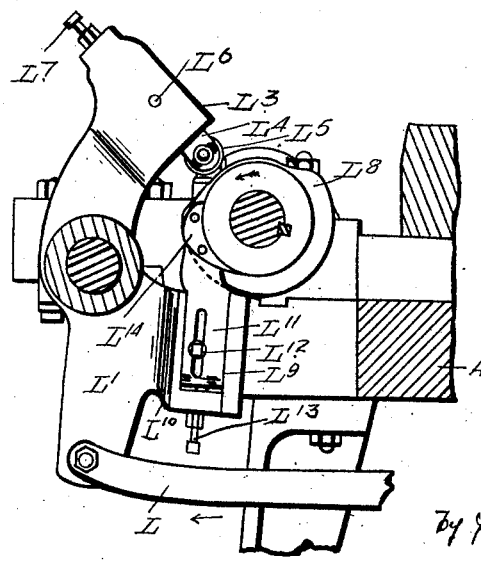
Figure 11:
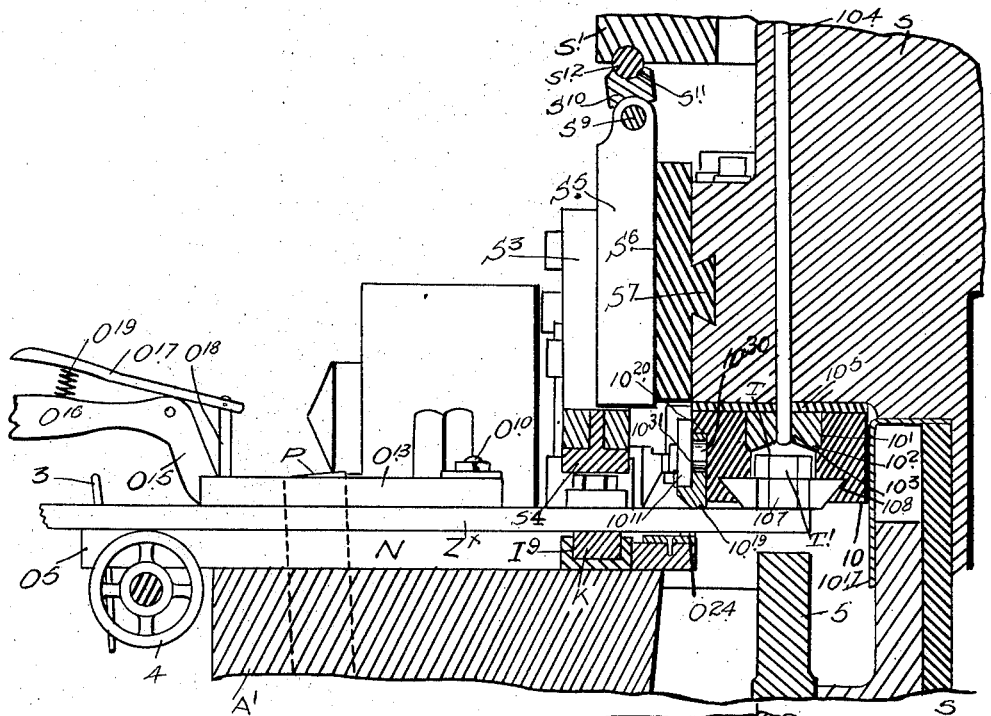
Figure 12:
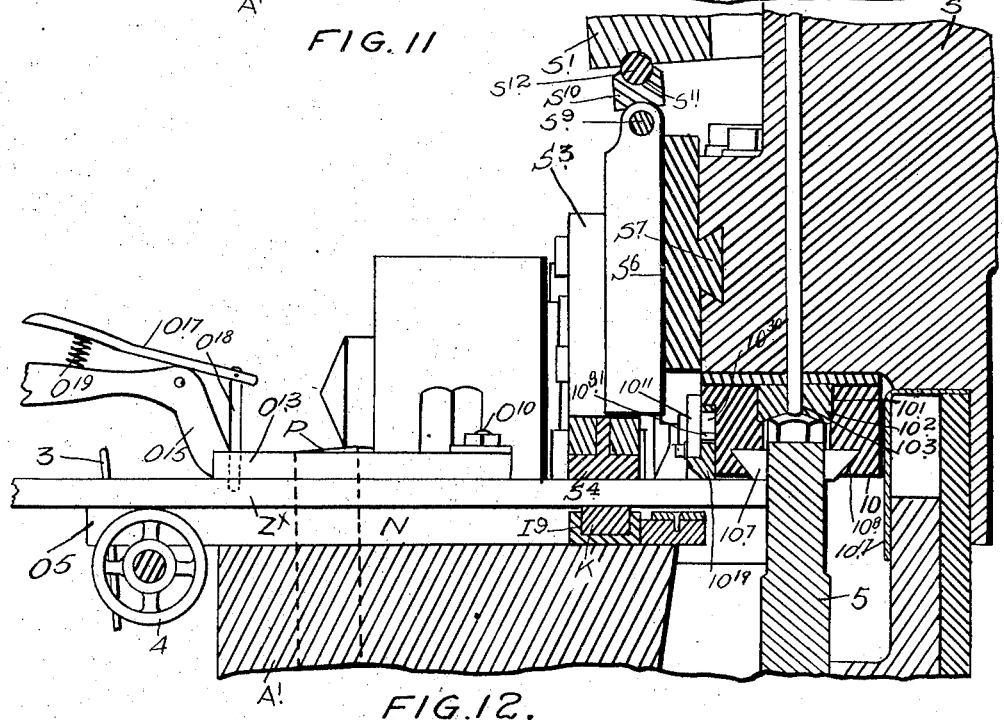
Figures 13, 14, 15, 16:
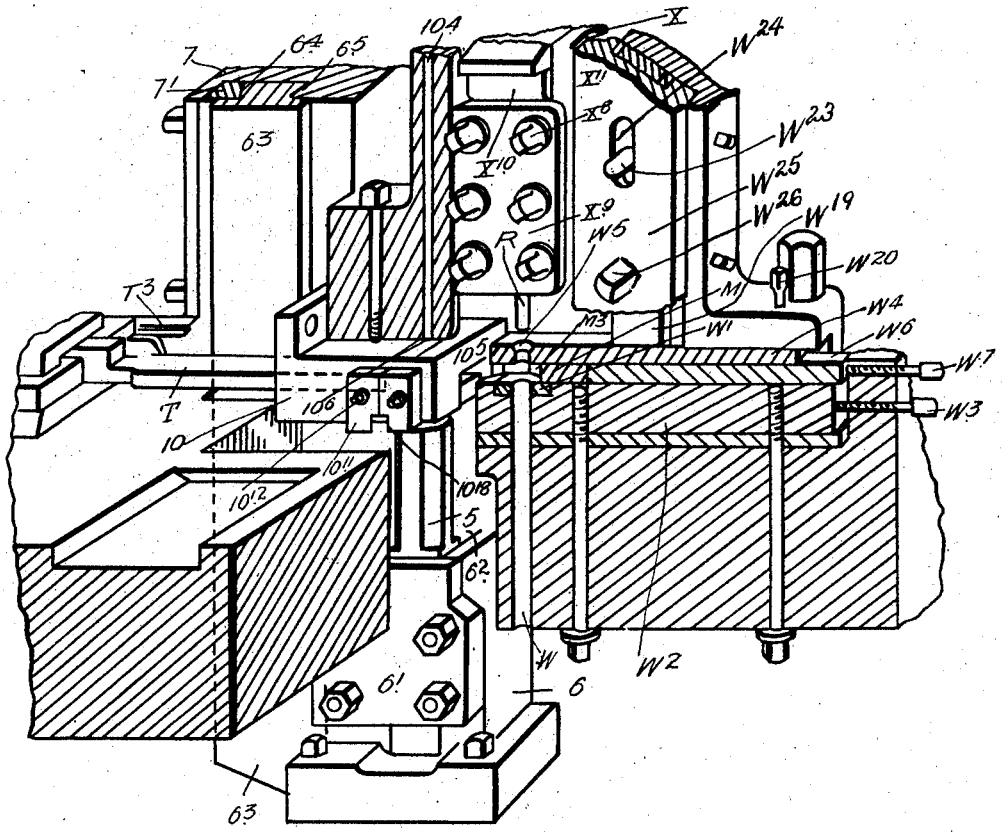
Figure 17:
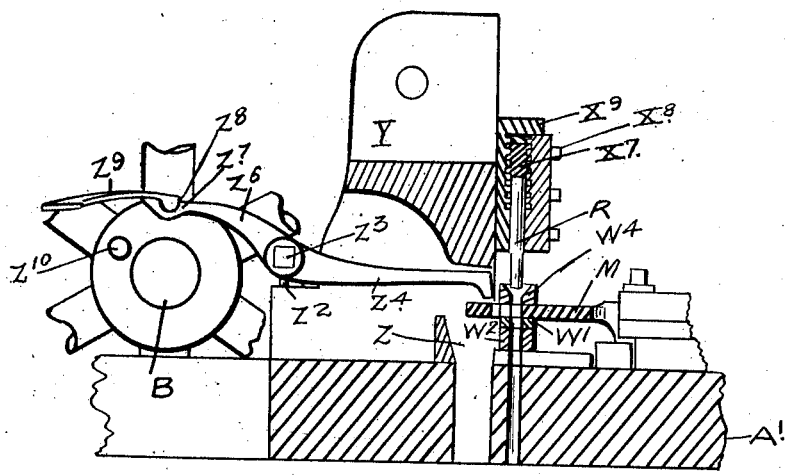
Figure 18:
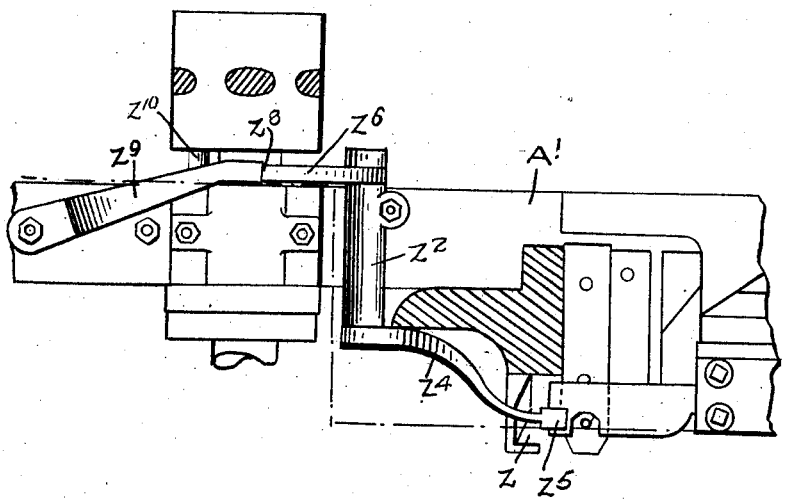
Figure 21:
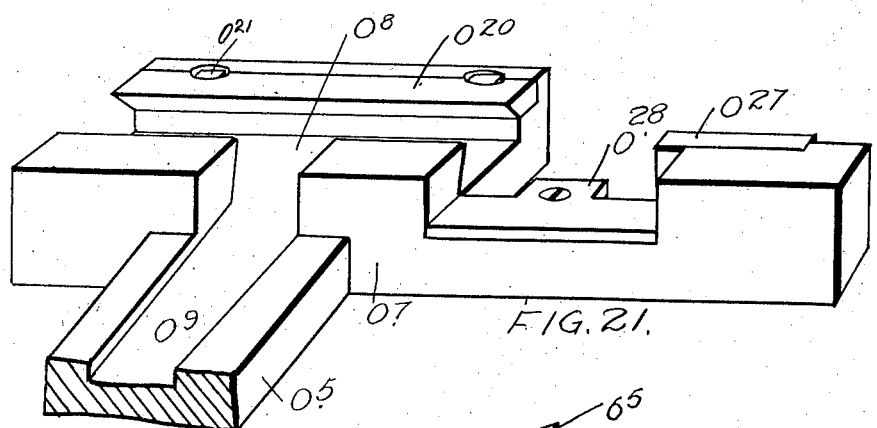
Figure 22:
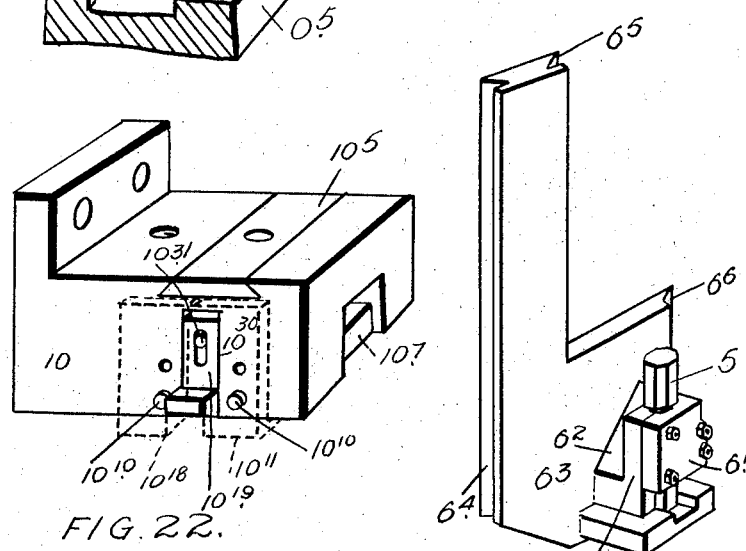
Figure 24:
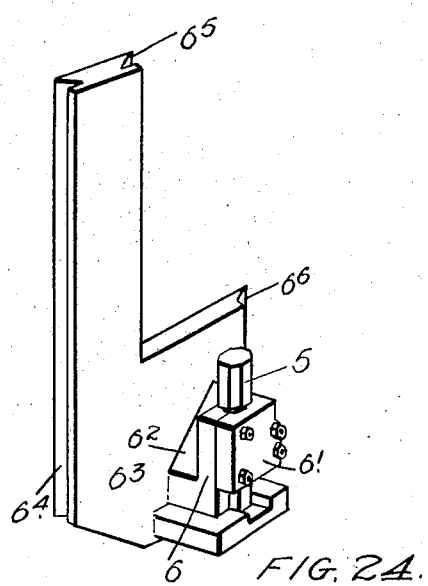
Figure 23:
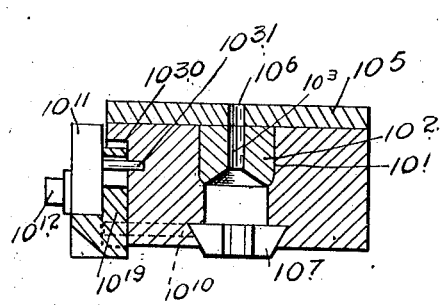
Figure 25:
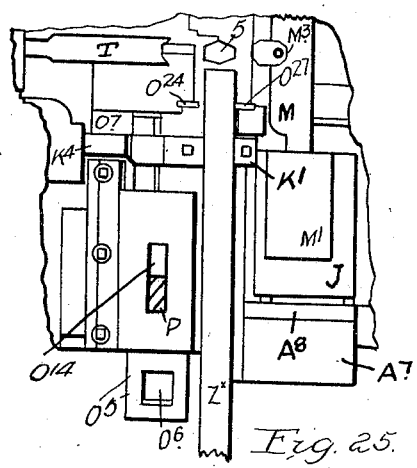
Figure 26:
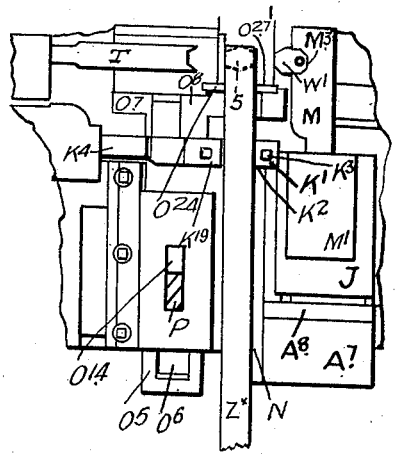
Figure 27:
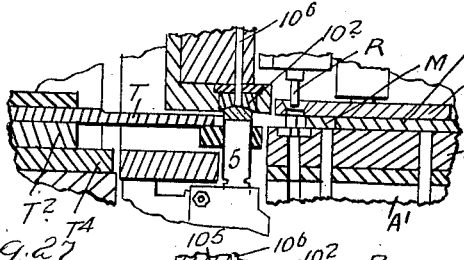
Figure 28:
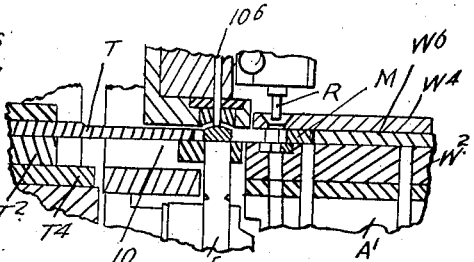
Figure 29:
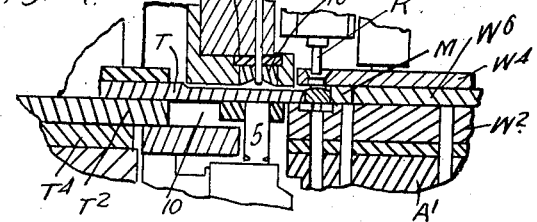
Figure 30:
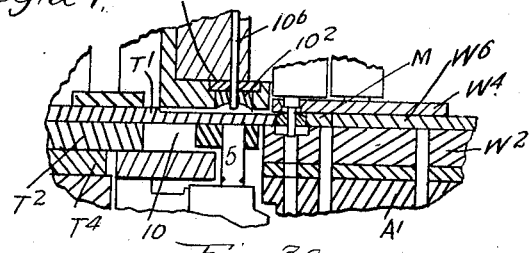
Figure 31:
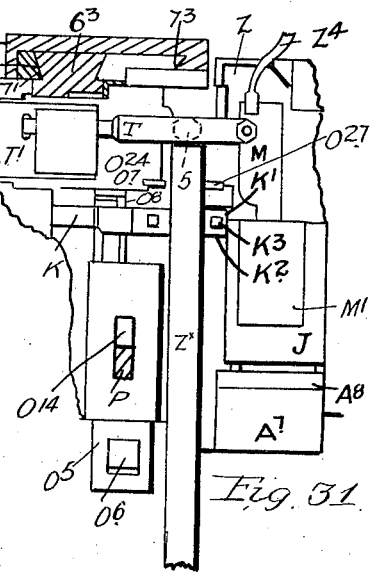

Figure 1, is a perspective view of my improved nut making machine taken from the side in which the bar is fed into the machine. Fig. 2, is a plan view of the machine complete. Fig. 3, is a plan view partially in section showing the standards to which the shears, the sizers and the punch are connected and between which they operate. Fig. 4, is a vertical section on the line $x$—$y$ Fig. 3. Fig. 5, is a vertical section on the jogged line $x'$—$y'$ Fig. 3. Fig. 6, is a view at right angles to the former sections on the line $x^2$—$y^2$ Fig. 3. Fig. 7, is a section on the line $x^3$—$y^3$ Fig. 3. Fig. 8, is an enlarged perspective detail partially broken away and in section of the front of the machine shown in Fig. 1. Fig. 9, is an enlarged plan view of the front portion of the machine shown in Fig. 3 with the top slide of the feeder removed. Fig. 10, is a sectional detail showing the operating mechanism for the front hammer. Fig. 11, is an enlarged sectional detail of portion of Fig. 4, to show the feeding of the bar and the position of the shear preparatory to shearing the bar. Fig. 12, is a similar view showing the nut crowned. Fig. 13, is an enlarged perspective detail partially in section taken at right angles to the sections shown in Figs. 11 and 12 showing the shear block, the die block and die, the punch, the discharging chute for the shot and the stripper. Fig. 14, is a perspective detail of the shear block showing the gravity stop for preventing the waste end of the bar being fed back. Fig. 15, is view of the shear block looking from below. Fig. 16, is a section through the shear block and dies thereof showing the means for holding the dies in position. Fig. 17, is an enlarged sectional detail showing the front hammer, the punch, the discharge chute for carrying the shot away, the kicker for freeing the finished nut and the chute. Fig. 18, is a plan view of the parts shown in Fig. 17. Fig. 19, is a detail section of the crown kicker operating mechanism. Fig. 20, is a perspective detail of the shear holder casting. Fig. 21 is an enlarged detailed view of the T shaped end of the feed bar. Fig. 22, is an enlarged perspective detailed view of the shear block. Fig. 23 is an enlarged cross sectional view through the shear block and latch. Fig. 24 is an enlarged view of the shear casting showing the shear secured thereto. Fig. 25 shows the position of the side sizes, the feeding fingers, the formers and the shear in their initial position. Fig. 26 shows the bar $z^x$ carried forward by the feeding fingers over the shear. Fig. 27 is a vertical section through the side formers, shear and die block showing the nut in the position it assumes when it is sheared from the bar $z^x$ and carried upwardly by the shear 5 into the crowner $10^2$ of the die block. Fig. 28 shows a similar view to Fig. 27 on which the shear has receded downwardly to the level of the die block so as to carry the nut free of the crowner and allow it to be moved laterally by the former T beneath the punch R and into the former M. Fig. 29 shows the nut carried beneath the punch as described in relation to Fig. 28. Fig. 30 shows the punch in its operative position. Fig. 31 is a plan view showing the nut in position after it is punched.

In the drawings like letters of reference indicate corresponding parts in each figure.

A is the frame of the machine, which comprises the bed proper A', the legs $A^2$, the lower side bars $A^3$ and the front side bar $A^4$ and the back side bar $A^5$.

B is the main driving shaft and B' the main driving pulley and $B^2$ the hub of the pulley. The shaft B is journaled in suitable bearings C C secured to the projecting rear portions $A^6$ forming part of the bed A'.

D is a bevel gear wheel secured at the opposite end of the shaft, which meshes with the bevel gear wheel E on the end of the shaft F, which is journaled in suitable bearings G G secured to one side of the bed A'.

From the shaft B is driven the feed, the top sizer, the front hammer, the punch, the crown kicker and the main kicker for discharging the nut when formed and the back hammer when used to make a square nut. From the shaft F is driven the side sizer, the side hammer and the relief mechanism in connection with the feeder.

I shall first describe the means whereby the bar is sized prior to being fed into the machine.

$A^7$ is a block forming part of the bed.

$A^8$ is a plate located to the back of the block $A^7$ and held in position by set screws H. (See Fig. 3).

I is a supplemental bed secured to the bed A by a bolt 2 (see Fig. 7) and abutting the plate $A^8$. The bed I has a semi-dove tail tongue I', which fits into a correspondingly formed recess $I^2$ in the bed A' slightly larger than the dove-tail. The set screw $I^{12}$ extends through the side of the bed A' (see Fig. 5) against the straight side of the dove-tail, and thereby serves to hold the supplemental bed I in position. A supplemental hold-fast screw $I^3$ is also provided which extends through the bed I. The bed I has an upwardly extending flange $I^4$ to which the semi-dove-tail guide-way $I^5$ is secured by suitable set screws $I^6$ and bolts $I^7$.

J is the sliding bed, which is held between the guide-way $I^5$ and guide-way $I^8$ forming part of the bed I. $I^9$ is a recess made in one side of the bed I and having fitted therein the stationary bottom K of the sizer. K' is the stationary side of the sizer, which extends partially over the bottom K and is secured in position by a plate $K^2$ held by bolts $K^3$. The sliding bed J is provided with a recess J' through which extends the upper end of the lever $J^2$, which is held in suitable ways $J^3$ forming part of the lower end of the lever $J^4$ which is fulcrumed on a bracket $J^5$ attached to one of the bottom bars of the frame (see Fig. 7).

L is a pitman, which is connected at one end to the lever arm L', which is hung on the counter-shaft $B^4$ operating in connection with the main shaft B as will hereinafter appear. The opposite end of the pitman L extends through guiding notches $A^{10}$ in the frame.

$J^6$ is a block having end projections $J^7$ rounded at the inside and abutting the sides of the wall of the lever $J^4$. The block $J^6$ extends into a channel bar $L^2$ forming portion of the pitman L, the ends being provided with slots $J^8$ through which bolts $J^9$ extend in order to permit the adjustment of the lever.

$J^{10}$ is a set screw for adjusting the position of the block $J^6$.

$J^{11}$ is a flat spring secured to the bottom bar $A^4$ of the frame and connected by a hook bolt $J^{12}$ to a portion of the lever $J^4$. The tendency of the spring $J^{11}$ is to exert a forward pressure on the lever $J^4$, and to take up lost motion.

M is the front former, which is secured in position by the cap plate M' secured in position by the bolts $M^2$. The front end of the former is provided with a notch $M^3$, in this instance, of the form of the major portion of a hexagonal nut.

N is a feeding way into which the bar $Z^x$ is inserted from which the nut is formed. The feeding way extends from the face of the bed A' to the sizing bar, the stationary ones of which have been already described. One side N' of the feeding way is formed by a step in the bed A' and the opposite side is formed by the side of the supplemental bed O. The supplemental bed O is held from longitudinal displacement by end clips O' secured to the side of the bed by bolts $O^2$. The bed O is formed with a longitudinal groove $O^3$ and a dove-tail groove $O^4$ immediately above it.

$O^5$ is a feeding bar, which is provided with an end slot $O^6$ into which extends the spring 3 secured at the bottom to the side of the frame. The front end of the bar $O^5$ is provided with a T-shape cross head $O^7$ formed with a guide-way $O^8$ and said bar $O^5$ is also provided with a notch $O^9$ in the front end of which is pivoted on a pin $O^{10}$ the T-arm $O^{11}$ (see Fig. 9).

$O^{12}$ is a slot in the feeding bar into which extends the upper end of the lever P, which is shown in Fig. 7 and corresponds in every respect to the lever $J^4$ hereinbefore described in reference to Figs. 1, 5 and 7, with the exception, that the disposition of the parts connected to the lever are on the opposite side. The means by which the lever derives its movement I shall describe hereinafter.

$O^{13}$ is a plate fitting into the dove-tail guiding groove $O^4$ at the top of the bed O. The plate $O^{13}$ is cut away at one side as indicated and is provided with a slot $O^{14}$ opposite the slot $O^{12}$.

$O^{15}$ is a notched arm pivoted on the pin $O^{10}$ and engaging normally with the upper end of the lever P.

$O^{16}$ is a stationary bracket attached to or forming part of the plate $O^{13}$.

$O^{17}$ is a lever pivoted in a fork at the inner end of the bracket $O^{16}$ and having a jaw at the outer end connected at its inner end with the arm 15 by a pin $O^{18}$ extending through the arm $O^{15}$ into the plate $O^{13}$. A spiral spring $O^{19}$ extends between the lever $O^{17}$ and the bracket $O^{16}$ and normally serves to hold the pin in the plate $O^{13}$ and the notched arm $O^{15}$ in engagement with the upper end of the lever P. By depressing the outer end of the lever $O^{17}$ the arm $O^{15}$ may be disengaged from the upper end of the lever P for a reason, which will appear hereinafter.

The inner end of the feeding bar is provided with a bar extending across the feeding way N and having a feeding nib $O^{27}$ extending upwardly therefrom.

$O^{28}$ is a plate affixed to the top of the feeding bar, and designed to form a rest for the nut bar $Z^x$. When worn it may be readily replaced.

$O^{20}$ is a guide-way secured at the outer end of the cross head $O^7$ by bolts $O^{21}$. The head $O^7$ is provided with a recess $O^{22}$.

$O^{23}$ is a plate fitting between the guide-ways $O^8$ and $O^{20}$ and carrying the feeding nib $O^{24}$ preferably made of hardened steel let into the plate $O^{23}$ (see Fig. 8).

The T-end of the bar $O^{11}$ is connected by a link $O^{25}$ to the head $O^7$, and by a link $O^{26}$ to a pin extending from the bottom of the plate $O^{23}$.

As the lever P is caused to move forward it carries with it the plate $O^{13}$ and T-bar $O^{11}$, thereby straightening out the links $O^{25}$ and $O^{26}$ more into alinement with each other and thus forcing the feeding nib $O^{24}$ into contact with the bar $Z^x$ from which the nut is made, and pressing such bar $Z^x$ against the feeding nib $O^{27}$. As the lever P is still caused to move forward it carries with it the bar $O^5$ and as the bar $Z^x$ of iron from which the nut is made is already gripped by the nibs $O^{24}$ and $O^{27}$ it will be fed forward a requisite distance to place it in position for the making of a nut. The movement necessary to impart to the lever P to effect this object is provided for by a cam Q (see Fig. 4), which is located on the main shaft B and co-acts with a roller $Q'$ adjustably held on the end of the lever arm $Q^2$ fulcrumed on the shaft $B^4$ and having the lower end connected by a pitman $Q^3$ to the lever P.

The style of connection of the pitman $Q^3$ to the lever P is the same as that described of the pitman L to the lever $J^2$. The pitman $Q^3$ is, however, adjustably connected to the lever arm $Q^2$ by means of a screw spindle $Q^4$, which extends upwardly into a slot $Q^5$ in the lever arm in which is held a block $Q^6$ to which the end of the pitman $Q^3$ is pivotally connected. The lower end of the screw spindle is provided with collars $Q^7$ one on each side of the end of the lever arm and the end of the screw spindle is square. As the screw spindle extends through a corresponding thread in the block $Q^6$ it will be readily understood that by turning the screw spindle the desired adjustment or throw of the pitman is effected suitable for the work. The roller $Q'$ may be also adjusted as it is journaled in bearings on the end of the slide $Q^8$, which is held in guideways on the end of the lever arm by the bolt $Q^9$ extending through a slot $Q^{10}$ in the slide. A set screw $Q^{11}$ extends through a boss $Q^{12}$ and abuts and holds the roller in the desired position relative to the cam Q.

As hereinbefore premised and as shown in the drawing the shaft rotates in the direction indicated by arrow and movement is imparted to the lever P by the cam Q. The first movement is a quick movement, so as to throw the lever inwardly and feed by means of the nib $O^{27}$. The retrograde movement of the lever is more gradual as far as the operation of the cam is concerned but hastened by means of the spring 3, which acts on the outer end of the slide $O^5$, the movement, however, being controlled by means of the face cam $F'$ secured to the end of the shaft F and co-acting with the lever $F^2$ having a roller $F^3$ engaging with the cam, and the opposite end engaging with the outer face of the upper end of the spring 3. The lever $F^2$ is fulcrumed on a bolt extending upwardly from a bracket $F^4$ attached to the bed $A'$.

It will be seen that if it is desired to stop the feed in case of a defect in the nut bar $Z^x$, or on account of any part of the machine getting out of order the lever $O^{17}$ may be thrown so that the notched lever may be brought free of the lever P and thus cause the lever to move free in the slot $O^{12}$.

The front former M hereinbefore described is manipulated through a pitman L, which is connected to a lever arm $L'$, the upper end of which is provided with a guide-way $L^3$ in which fits a bar $L^4$ having a roller $L^5$ journaled in jaws at the lower end thereof. A bolt $L^6$ extending through a slotted hole in the bar holds the bar $L^4$ in position and by unloosening the bolt and adjusting the set screw $L^7$ the roller may be adjusted to and from the cam $L^8$ with which it co-acts (see Figs. 1, 5 and 10).

$L^9$ is a guide-way made in the off-set $L^{10}$ forming part of the lever arm $L'$.

$L^{11}$ is a slotted bar held in the guide-way $L^9$ by a suitable headed bolt $L^{12}$.

$L^{13}$ is a set screw, which extends through the closed end of the guide-way and abuts the end of the bar $L^{11}$. By unloosening the bolt $L^{12}$ the bar $L^{11}$ may be adjusted to and from its co-acting cam $L^{14}$.

The cam $L^{14}$ acting with the bar $L^{11}$ serves to impart as will readily be seen a movement of the bar L in the direction indicated by arrow, thereby throwing the lever $J^2$ and consequently the front former M forward to carry the nut forward from the position in which it is held in the notch in the former shown in dotted lines in Fig. 9, to a point past the punch R, where the nut drops as will hereinafter appear.

The cam $L^8$ co-acting with the roller $L^5$ serves to restore the former to its normal position ready to receive the next nut from the side former by pulling upon the pitman L in the opposite direction to that indicated by arrow and thereby throwing the lever $J^2$ and former in the opposite direction.

The bar is fed in over the supporting roller 4 attached to the bed opposite the feeding way N. This roller is shown removed in Figs. 1 and 8.

I have hereinbefore described the stationary bottom K and stationary side K' of the sizer (see Fig. 7). I shall now describe the reciprocating side and top sizers and the manner in which they co-act with the stationary side and bottom.

$K^4$ is a bar, which rests at the outer end and slides upon the minor bed $K^5$, which is secured in position as indicated in Fig. 7, by a semi-dove-tail tongue $K^6$ fitting into a corresponding recess $K^7$ at the top and at one side of the bed A', the tongue being held in position by a set screw $K^8$. The bar $K^4$ is provided with slots $K^9$ and $K^{10}$ and a plate $K^{11}$ fits over the top of the bar $K^4$ and is secured in position by bolts $K^{12}$ and $K^{13}$ extending through bolts $K^9$ and $K^{10}$ respectively. A slot $K^{14}$ is made in the plate $K^{11}$ and a pin $K^{15}$ extends into the bar $K^4$ through said slot, the pin $K^{15}$ being connected by a spiral spring $K^{16}$ to the bolt $K^{18}$. The inner end of the bar $K^4$ extends over the feeding bar $O^5$ in the slot $O^7$ of which works the T-arm $O^{11}$ (see Figs. 1, 2, 3, 7, 8 and 9). The bar $K^4$ is shown broken away in Fig. 9. The end of the bar $K^4$ is formed with a step $K^{17}$ on which is secured a hardened steel block $K^{18}$ by a plate $K^{19}$ held in position by a bolt $K^{20}$. This steel block is the block that is actually brought against the bar $Z^x$ from the side to size it. The bar $K^4$ is provided at the opposite end with a hardened block $K^{21}$, which is secured on a step by a bolt $K^{22}$.

In order to impart the desired forward movement to the bar $K^4$ I provide a lever $K^{23}$, which is journaled on a bracket $K^{24}$ secured to one of the bottom bars of the frame. The upper end of the lever $K^{23}$ is provided with a jaw $K^{25}$ in which is journaled a roller $K^{26}$. $K^{27}$ is a collar secured to the shaft F and carrying a cam $K^{28}$, which when the shaft rotates in the direction indicated by arrow operates against the roller $K^{26}$ and thus imparts the necessary length of movement to the bar $K^4$ hereinbefore referred to. The spring $K^{14}$ serves to provide for the retrograde movement, and take up the lost motion.

I shall now describe the means by which the top sizer is driven so as to size the bar $Z^x$ from which the nut is made.

S is a standard secured to the top of the bed plate A'.

S' is a lever pivoted on a spindle $S^2$ held in the standard S.

$S^3$ is a sizer bar and $S^4$ a block preferably of steel T-shaped in cross section, which fits and is suitably held in the lower end of the sizer bar, which is formed in an L or angle-shape, so that the base of the L extends over the feeding way in order that the block may be brought down against the bar $Z^x$ previous to its being fed to the shear. The sizer bar $S^3$ is bolted to a bar $S^5$, which is held in suitable guide-ways $S^6$ secured to the front of the standard S by a cross dovetail connection $S^7$.

$S^8$ is a forked link between the members of which extend the forward end of the lever S'. The lower end of the link $S^8$ is connected to the upper end of the bar $S^5$ by a cross pin $S^9$ and between the upper end of the bar $S^5$ extends a block $S^{10}$, which is provided with an arc-shaped recess at the bottom to fit the top of the bar $S^5$ and an arc-shaped recess $S^{11}$ at the top into which fits a roller $S^{12}$. The roller $S^{12}$ extends into a similar recess at the bottom of the front end of the lever S' (see Fig. 4). A set screw $S^{13}$ is provided with a suitable lock nut and extends through the top of the link $S^8$ and abuts the front end of the lever and thereby holds the link $S^8$ connected to the lever S' (see Figs. 1, 8 and 11). The rear end of the lever S' co-acts with a cam $S^{14}$, which also operates the return movement of the front feed. Such cam is secured on the shaft B (see Fig. 2), the rear end of the lever S' and the cam being similar to the rear end of the lever and cam shown in Fig. 18, and designed to operate the front kicker as will hereinafter appear. In the initial stage the bar $Z^x$ is fed by hand over the roller 4 until it comes opposite the sizing devices.

I have described the manner in which the bar $Z^x$ is fed and this feeding takes place immediately after the bar $Z^x$ is sized. The feeding device now brings the bar $Z^x$ forward after being sized so that the end of the bar $Z^x$ is opposite the shear, which I designate 5. The shear 5 is held in the stock or socket 6 by a holding plate 6'. The stock 6 has formed behind it an inclined chute $6^2$ and a plate $6^3$ right angular in form (see Figs. 20 and 24) having a groove $6^4$ formed at the longer vertical side and a groove $6^5$ formed at the upper short vertical side and a groove $6^6$ formed at the lower short vertical side. As shown in Fig. 13, 7 is a plate extending upwardly through an opening in the bed A′ and secured to the standard S. The plate 7 is provided with a corresponding tongue 7′ into which the groove $6^4$ fits, a corresponding tongue $7^2$ into which the groove $6^5$ fits and a corresponding tongue $7^3$ in which the groove $6^6$ fits, thereby providing for a rigid strong light way to insure the vertical upward movement of the shear. The bottom of the stock 6 has secured to or forming part of it a depending lug $6^7$ to which is pivotally connected a link $6^8$.

The requisite movement of the shear is imparted to it by means of a heavy lever $6^9$, which is journaled on a stud shaft $6^{10}$ held in the depending jaw $6^{11}$ suitably secured and held to the bed A′ (see Fig. 4). A steel angle plate 8 is securely bolted at the front end of the lever and has an arc-shaped upper boss 8′, which fits into a corresponding recess at the bottom of the link $6^8$. A leaf spring $8^3$ is secured to the bottom forward end of the lever and is designed to hold the front end of the lever up, the pressure necessary for this purpose being regulated by a set screw $8^4$ extending through a strap $A^7$. The rear end of the lever has pressing against it a spring $8^5$ which is secured to the back side bar $A^5$ of the frame. The upper rear end of the lever $6^9$ is provided with a notch $6^{10}$ in which is secured a bar $6^{11}$ having an end jaw carrying a roller $6^{12}$. The bar $6^{11}$ is secured in position by a suitable bolt $6^{13}$ passing through a slotted hole in the bar $6^{11}$ and provided with a suitable nut. The position of the roller $6^{12}$ is adjusted by means of a set screw $6^{14}$ extending through the lever $6^9$ opposite to the end of the bar $6^{11}$.

$6^{15}$ is a bar having an inclined upper end, such bar being secured in position by a bolt $6^{20}$ passing through a slotted hole in the bar and being adjustable by a set screw $6^{16}$ passing through a boss $6^{17}$. The bar $6^{15}$ is located to the inner side of the bar $6^{11}$ shown in Fig. 4. The roller $6^{12}$ co-acts with the cam 9, which is a quick pitch cam and the inclined end of the bar $6^{15}$ co-acts with the cam 9′, which is also a quick cam of less radius than the cam 9 and having a concentric portion for a purpose, which will hereinafter appear. The cam 9 is also formed with a concentric portion but the portion of the cam which operates the shear is practically an acute angle. The shear 5 co-acts with the shear block 10, which is provided with an orifice 10′ having a crowning cap $10^2$ concaved beneath it and provided with a central orifice $10^3$. Into this orifice extends a vertical spindle $10^4$ through a top plate $10^5$ (see Figs. 11, 12, and 13).

$10^{20}$ is an arm secured to the shear lever $6^9$. $10^{21}$ is an arm secured to the shaft $B^4$. Such arm $10^{21}$ is held in a stationary position and has pivotally secured to it the link bar $10^{22}$, which is connected by a link $10^{23}$ to the free end of the arm $10^{20}$.

$10^{24}$ is a cam secured on the shaft B. The cam $10^{24}$ operates against the projection $10^{25}$ forming part of the bar $10^{22}$ to insure the full return movement of the shear lever ready for the next operation.

The spindle $10^4$ extends through an orifice $10^6$ in the plate $10^5$ dove-tail in cross section and fitting into a corresponding groove in the top of the shear block 10 and serving to hold the crowning block $10^2$ in position. The form of the orifice 10′ is, where a hexagonal nut is to be made, hexagonal in shape and the block 10 is provided with a divided die-block $10^7$ having half of the hexagonal formed at each side, the die block being formed with dove-tail tongues at the side to fit into a corresponding groove $10^8$ in the shear block, which terminates at one end near the side of the shear block. Each half of the divided die-block $10^7$ is provided with a semi-hexagonal notch $10^9$ (see Fig. 15) which together form a hexagonal opening through which the shear is designed to pass, the shear in this particular case being also hexagonal in cross section. The die block $10^7$ is a loose fit in the groove $10^8$, so that it may be readily inserted therein, but is held rigidly from the side by means of pins $10^{10}$ having beveled inner ends, the outer ends projecting beyond the side face of the block. The pins $10^{10}$ are pressed inwardly by means of plates $10^{11}$ secured in position by set screws $10^{12}$ (see Figs. 13, 14, 15, 16, 22 and 23). The die block $10^7$ is held against the closed end by a supplemental block $10^{13}$ secured in position by plates $10^{14}$ abutting the ends of the block $10^{13}$ and secured in position by set screws $10^{15}$ (see Figs. 6 and 15). The lever $6^9$ through the roller $6^{12}$ coöperating with the cam 9 forces the shear 5 upwardly against the bar $Z^x$ from which the nut is cut (see Fig. 11) the inner end of which is opposite the inner face of the shear and severs the nut, which in this case is hexagonal in form, and forces it up through the die block. The tri-angular pieces necessarily left at the extreme ends (for the end of the bar $Z^x$ is necessarily at first rectangular) when they are severed drop behind the shear holder 6 on the incline chute or way $6^2$ (see Fig. 20 and in dotted lines in Fig. 6) and thence passes downwardly to the chute 11 where this refuse is discharged. The shear 5 passes up through the die block $10^7$ carrying with it the nut into the position shown in Fig. 12 at which point the roller $6^{12}$ of the lever $6^9$ has reached the apex of the cam, thereby crowning the nut as indicated in Fig. 12, against the crowning block $10^2$. At this point the cam 12 on the collar $12'$ (see Figs. 2, 4 and 6) co-acting with the lever 14 fulcrumed on a pin $S^2$ in the standard 2 and adjustable block $14'$ at the front end thereof operates the kicker rod $10^4$ and frees the crown, the kicker rod having been previously raised by the shear forcing the nut upwardly into the crowning block $10^2$. The roller $6^{12}$ now having passed over the apex of the cam 9 the inclined end of the bar $6^{15}$ co-acting with the cam $9'$ keeps the lever stationary as it runs on the concentric portion of the cam $9'$ and therefore the shear stationary when the nut drops back into the position immediately above the die block. The top of the shear is then level with the top of the block. At this point the side former is operated as I shall presently describe.

I provide a shield $10^{17}$, which extends over the top of the guiding plate $6^3$ to which the shear is attached as hereinbefore described. The shield is L-shaped in cross section and the holding plate $6^3$ moves up between it and the back of the guide-way. The shield serves to prevent any pieces cut from the bar from passing above the plate.

The plate $10^{11}$ hereinbefore referred to is a divided plate being provided at the lower end with a notch $10^{18}$ at the abutting edges of the plates. A gravity latch $10^{19}$ is located in a groove $10^{30}$ at the end of the shear block 10 being held in position by a pin $10^{31}$ extending through a slot in the gravity latch. The head of the latch fits in the notch $10^{18}$ when it is in the raised position. The bar $Z^x$ of iron from which the nut is made passes under this gravity latch, which necessarily is to the front of the block, and when the bar has been fed in to the full extent and all the bar has been practically used up the latch drops down behind the remaining part of the bar $Z^x$ and prevents it being fed backwardly again when the feeding bar is caused to recede. The shear punches the nut from this end and the refuse then drops down through the machine. It will be noticed that the head of the latch is beveled, so that the next bar fed in will raise it as it passes on to the position above the shear and beneath the die.

When the nut is located above the die block subsequently to being crowned as hereinbefore described it is necessary that the nut be carried from such position to a position in the notch $M^3$ of the front former in order that the hole may be punched from the center of the nut to complete it. To effect this purpose I provide a side former T adapted to enter the recess $M^3$ of the front former M having a notch $T'$ at the inner end. The former T is held in a holder $T^2$ located between suitable guide-ways $T^3$. The holder is supported at the bottom on a plate $T^4$ having a semi-dove-tail tongue at the bottom fitting into a corresponding groove in the bed $A'$ and held therein by a set screw $T^5$. A cross bar $T^6$ is provided, which has end trunnions to which is connected the side links $T^7$. The opposite end of the side links are pivotally connected to a pin $T^8$ at the upper end of the lever U, which is fulcrumed at the bottom on a bracket $U'$ secured to one of the side bars of the bottom of the frame. The lever U has journaled in a recess in the upper end thereof a roller $U^2$, which co-acts with a cam $U^3$ secured on the shaft F. A roller $U^4$ is provided, which is journaled between the two sides of the extension frame $U^5$ secured to the lever U. A pin $U^6$ on both sides of the cam $U^3$ contacting with the upper end of the frame $U^5$ serves to start the backward movement of the former. The cam $U^3$ rotates in the direction indicated by arrow and being connected to the holder $T^2$ as hereinbefore described a reciprocatory movement is imparted to the side former, so as to intermittently and at the proper moment carry the nut struck out by the shear into the notch $M^3$ underneath the punch R, which derives a vertical reciprocating movement in the manner I shall presently describe, so as to punch a hole in the center of the nut when it is held between the notch $M^3$ in the front former and the notch $T'$ in the side former.

The shot is carried down through a tubular conduit W and delivered to a separate receptacle (not shown) see Figs. 5 and 6. The tubular receptacle or conduit W extends to the top of the bed $A'$ and die block $W'$, which is secured in the block $W^2$ suitably held in the bed by set screws, such as $W^3$. A stripper $W^4$ having an orifice $W^5$ extending therethrough is provided, which is secured in position on the dead former $W^6$ adjustably held above the block $W^2$ by a set screw $W^7$. The punch, of course, passes through this orifice and is stripped as it recedes (see Fig. 13). The stripper $W^4$ is secured in position by the set screw $W^{20}$, and by the vertically slidable bar $W^{19}$ held in a suitable guide-way. The bar $W^{19}$ is provided with slots $W^{21}$ and $W^{22}$ and a projecting pin $W^{23}$ extending through a slot $W^{24}$ in the cap plate $W^{25}$.

$W^{26}$ and $W^{27}$ are bolts extending through the plate $W^{25}$ and through the slots $W^{21}$ and $W^{22}$ into the back of the way.

$W^{28}$ is a set screw securing the bar $W^{19}$ in position against the stripper. By loosening the set screw $W^{28}$ the bar may be raised to free the stripper.

It will be noticed on reference to Fig. 13, that the front former M passes between the stripper and the block $W^2$ or more properly the die block $W'$.

I shall now describe the punch and the means by which it is held and from which derives its reciprocating vertical movement.

X is the punch slide, which is located in a guide-way formed in the standards S and Y.

$X^1$ is a straddle block inverted U-shape in cross section and fitting under the head $X^2$ of the slide X (see Fig. 5.) The bottom of the straddle block $X^1$ is provided with a dove-tail groove $X^3$.

$X^4$ is a slide block in the form of a dove-tail shape tongue and fitting in the dove-tail groove $X^3$, the front of which is closed as indicated. The bottom of the tongue $X^4$ is provided with an arc-shaped groove $X^5$.

R is the punch, which is provided at the upper end with a threaded enlargement $X^7$ as indicated, which thread fits into corresponding orifices in the lower portion $X^9$ of the slide X, which is provided with a cap plate also forming portion of the threaded orifice and secured in position by suitable bolts $X^8$, thereby allowing of the vertical adjustment of the punch.

It will be seen that the slide X has an orifice extending between the head $X^2$ and the lower portion $X^9$. The lower portion $X^9$ is provided with a cap plate $X^{10}$ and a block $X^{11}$ having an arc-shaped recess in which fits a roller $X^{12}$.

$X^{13}$ is a lever fulcrumed on the pin $S^2$ suitably supported in the standards as hereinbefore described.

$X^{15}$ is a block provided with an arc-shaped top, which fits into the recess in the bottom of the slidable tongue $X^4$. The block $X^{15}$ is suitably secured at the top of the front end of the lever and is a steel block, so as to reduce the wear. The roller $X^{12}$ fits into a recess at the bottom of the front end of the lever $X^{13}$.

$X^{16}$ is a cam secured on the main shaft B and provided with a raise $X^{17}$, see dotted lines Fig. 5.

$X^{18}$ is a roller secured within a jaw $X^{19}$ at the rear end of the lever and co-acting with the projection $X^{17}$.

$X^{20}$ is an arm secured to the rear end of the lever and pivotally connected at the bottom to a link $X^{21}$.

As the cam $X^{16}$ is caused to rotate in the direction indicated by arrow it imparts to the punch R a sharp downward movement by means of the projection $X^{17}$. The lever is restored to its normal position by means of a pin $X^{22}$ on the cam coming in contact with the curved portion of the link $X^{21}$. When the lever is caused to recede by the pin $X^{22}$ the punch R is stripped of the nut and the shot passes through the tube W as hereinbefore described. After the nut is completed I discharge it by means of the following mechanism.

The front former is operated as hereinbefore described after the hole has been punched in the nut, so as to bring the nut in the notch $M^3$ over the orifice Z extending through the bed $A'$ and of which orifice the discharge tube $Z'$ is a continuation (see Figs. 5, 17, and 18). As it frequently happens that the nut sticks in the notch $M^3$ it is necessary to provide a means to insure of its discharge and for this purpose I provide the following mechanism.

$Z^2$ is a tubular bracket secured on the rear portion of the standard Y. $Z^3$ is a spindle extending therethrough.

$Z^4$ is an arm secured on one squared end of the spindle and having a broad end $Z^5$, which is designed to come over the position of the nut in the notch $M^3$ of the former M when it is over the chute Z.

$Z^6$ is an arm secured to the opposite end of the spindle $Z^3$ and having a broadened end $Z^7$ provided with a notch $Z^8$ into which fits the enlarged end of a spring $Z^9$ secured to the frame. The normal tension of the spring maintains the arm $Z^4$ in the position shown in Figs 17 and 18.

$Z^{10}$ is a pin projecting from the hub of the driving wheel $B'$. The pin $Z^{10}$ as the fly wheel rotates is so timed as to come in contact with the end $Z^7$ and thereby rock the spindle $Z^3$ and throw the arm $Z^4$, so that the broadened end $Z^5$ is quickly thrown against the nut in the notch $M^3$ and thereby discharges such nut into the chute Z should it have become stuck in the notch $M^3$ immediately upon the former M being brought, so that the notch $M^3$ is opposite the broadened end $Z^5$.

In case I wish to make a square nut and not a hexagonal nut I adjust the dead former $W^6$, so as to bring the inner end into closer proximity with the die block (see Fig. 13). I also employ a shorter reciprocating front former with a square end and a shorter side former with a square end opposite the dead former and a back former, not shown, which is held in a suitable holder $M^5$ located in guide-ways $M^6$ (see Figs. 3 and 5) and is operated from a lever $M^7$ fulcrumed on a bracket $M^8$ on one of the bottom bars of the frame. The lever $M^7$ has forward movement imparted to it through a cam $M^9$ and is drawn back by a spring $M^{10}$. The back former, of course, is opposite to the front former. By this means it will be readily seen that a square nut may be made with equal facility in my machine. Of course, in this case it is not necessary to use the kicker $Z^4$ hereinbefore referred to.

The nut bar $Z^x$ is initially fed into the machine by hand to between the sizers which operate against the sides of the bar so as to square the same. The nut bar is then gripped as it passes into the machine by feeding nibs $O^{27}$ and $O^{24}$ which carry the nut bar $Z^x$ to between the shear and the shear block. The shear then ascends against the bar $Z^x$ cutting the nut there from and forcing it into the die block $10^7$ by which the nut is roughly formed and crowned. The kicker $10^4$ then operates to free the nut from the crowner as the shear descends to a position flush with the top of the die block $10^7$. The side former T then operates, when the shear has reached this position carrying the nut laterally into the notch $M^3$ former in the front former M thereby accurately forming the sides of the nut. Immediately the sides of the nut have been formed the punch R descends so as to punch the center hole of the nut, the punching or shot dropping through the chute W. After this operation the front former passes rearwardly carrying the nut opposite the chute. The kicker arm $Z^4$ then operates against the nut freeing it from the former so that it will drop down the chute Z.

From this description it will be seen that I have provided a hot pressed nut making machine in which the nut is completely finished and the waste metal including the shot and the severed portion of the bar discharged separately into separate chutes, so that the nut may be delivered into one receptacle, the shot into another and the waste metal of the bar into another.

What I claim as my invention is.

1. In a nut making machine, a bed plate provided with a sided feeding way, means at the top for holding the bar down as it passes through the way and means for sizing the bar by a side stroke while it is being held down as and for the purpose specified.

2. In a nut making machine, a bed plate provided with a sided feeding way, means at the top for holding the bar down as it passes through the way, means for sizing the bar by a side stroke while it is being held down, feeding means for carrying the bar onward as soon as it is released by the top holding means, and a shear located at the inner end of the way as specified.

3. In a nut making machine, the combination with a sided way, of a sizer located at the inner end of the way and comprising stationary side and bottom members, a coacting reciprocating top member adapted to hold the bar midway stationary, and a coacting reciprocating side member adapted to size the bar by a side stroke while it is being held by the top member, as specified.

4. The combination with the die block holder having a bottom cross groove and orifice extending upwardly therefrom, of the divided die block abutting one end of the groove and the holdfast block arranged in the groove and engaging the die block and clamping plates and set screws securing the holdfast block in position in the grooves as and for the purpose specified.

5. The combination with the die block holder having a bottom cross groove and orifice extending upwardly therefrom, of the divided die block abutting one end of the groove and the holdfast block engaging the die block and clamping plates and set screws securing the holdfast block in position, and side pins abutting the side of the die block and the holdfast block and set screws for such side pins as and for the purpose specified.

6. The combination with the die block holder and die block fitting into a groove in the bottom of the holder and having an enlarged orifice extending upwardly in the holder therefrom, of a crowning block fitting against the shoulder of the orifice and a fastening plate fitting in the dovetailed groove and extending over the upper end of the crowning block as and for the purpose specified.

7. The combination with the holder and die block suitably secured therein and the bed having a feeding way extending underneath the die block holder, of the feeding means for the bar and a gravity latch for locking the remnant of the bar in position beneath the die block preparatory to the last nut of the bar being struck out as and for the purpose specified.

8. In a hot pressed nut making machine, the combination with the bed provided with a sided way, of a feeding means comprising a stationary and a movable nib extending across the inner end of the way, a holding plate for the feeding nib, guide-ways for the plate, a feeding bar at the inner end of which the holding plate and guides for the same are located provided with a notch at the inner end, a T-shaped arm pivoted in the notch, a link connecting the inner head of the arm to the bottom of the guide-way and the link connecting the head of the arm to the plate carrying the nib, suitable guide-ways for the feeding bar and means for imparting movement to the feeding bar as and for the purpose specified.

9. In a hot pressed nut making machine, the combination with the bed provided with a sided way, of a feeding means comprising a stationary and a movable nib extending across the inner end of the way, a holding plate for the feeding nib, guide-ways for the plate, a feeding bar at the inner end of which the holding plate and guides for the same are located provided with a notch at the inner end, a T-shaped arm pivoted in the notch, a link connecting the inner head of the arm to the bottom of the guide-way and the link connecting the head of the arm to the plate carrying the nib, suitable guideways for the feeding bar and a lever extending through a slot in the feeding bar and suitably fulcrumed in the frame, and a cam on the main shaft for imparting the requisite movement to the lever as and for the purpose specified.

10. In a hot pressed nut making machine, the combination with the feeding nibs, of the feeding bar designed to operate the movable nib and provided with an end slot, a spring secured to the frame and extending from the end slot, a lever journaled on a pin in the bed plate and having one end contacting with the end of the spring projecting through the slot aforesaid and the other end provided with a roller, a shaft suitably driven from the main shaft and provided with an end face cam designed to co-act with the roller on the end of the lever as and for the purpose specified.

11. The combination with the bed provided with a feeding way, of the feeding nibs comprising a stationary nib and a movable nib extending across the way, a feeding bar for operating the movable nib and provided with a slot and located in suitable guide-ways, the operating lever extending through the slot, the top plate extending over the feeding bar, the notched arm pivoted on a pin on the feeding bar and designed to normally engage with the lever and means for throwing the notched arm from engagement with the end of the lever as and for the purpose specified.

12. The combination with the bed provided with a feeding way, of the feeding nibs comprising a stationary nib and a movable nib extending across the way, a feeding bar for operating the movable nib and provided with a slot and located in suitable guide-ways, the operating lever extending through the slot, the top plate extending over the feeding bar, the notched arm pivoted on a pin on the feeding bar and designed to normally engage with the lever, a plunger pin extending through the notched arm into the top of the plate above the feeding bar and the lever connected to the plunger, a bracket in which such lever is pivoted and a spring designed to hold the plunger normally in the hole in the top plate, so as to lock the notched arm as and for the purpose specified.

13. The combination with the bed provided with a feeding way, of a stationary feeding nib and a movable feeding nib and means for imparting a lateral inward movement to the movable nib and a longitudinal movement to both nibs, and means for releasing the movable nib at the beginning of the return portion of its longitudinal movement as and for the purpose specified.

14. In a hot pressed nut making machine, the combination with the sided way, of a stationary sizer block located in the bottom of the way with its top flush with the bottom of the way, a top sizer block located above the way, a sizer block holder or bar having a lateral projection to hold the top sizer block over the way, and means for imparting a reciprocating movement to the bar as and for the purpose specified.

15. In a hot pressed nut making machine, the combination with the sided way, of a stationary sizer block located in the bottom of the way with its top flush with the bottom of the way, a top sizer block located above the way, a sizer block holder or bar having a lateral projection to hold the top sizer block over the way, a bar to which the last named bar is secured, a standard provided with suitable guide-ways in which the latter bar moves, and means for imparting a reciprocating movement to said latter bar as and for the purpose specified.

16. In a hot pressed nut making machine, the combination with the sided way, of a stationary sizer block located in the bottom of the way with its top flush with the bottom of the way, a top sizer block located above the way, a sizer block holder or bar having a lateral projection to hold the top sizer block over the way, a bar to which the last named bar is secured, a standard provided with suitable guide-ways in which the latter bar moves, a jaw connected by a pin to the bar moving in the guide-ways, a lever fulcrumed on the standard, a block and roller interposed between the bar in the guide-ways and the front end of the lever and a cam on the main shaft co-acting with the rear end of the lever as and for the purpose specified.

17. The combination with the bed provided with a suitable sided way and a stationary sizer block located on the side of the way near the inner end, of a sizer bar located opposite the said block and supported in suitable guide-ways and provided with slots, a plate fitting on the top of the sizer bar under which it moves, bolts extending through the top plate and slots in the sizer bar, a pin extending through a slot in the top plate into the sizer bar, a spring connecting the pin extending through the slot in the plate into the sizer bar with one of the bolts extending through the plate and through the slot in the sizer bar and means for imparting an inward movement to the sizer bar as and for the purpose specified.

18. The combination with the bed provided with a suitable sided way and a stationary sizer-block located on the side of the way near the inner end, of a sizer bar located opposite the said block and supported in suitable guide-ways and provided with slots, a plate fitting on the top of the sizer bar under which it moves, bolts extending through the top plate and slots in the sizer bar, a pin extending through a slot in the top plate into the sizer bar, a spring connecting the pin extending through the slot in the plate into the sizer bar with one of the bolts extending through the plate and through the slot in the sizer bar, a lever fulcrumed at the bottom on the frame and abutting the end of the sizer bar and provided with a roller at the top and a cam on the shaft suitably driven designed to co-act with said roller as and for the purpose specified.

19. In a hot pressed nut making machine, a shear vertically disposed and designed to move upwardly to the bar, a holder for the shear provided with a receiving recess and a plate for securing the shear in the holder, a guide for the holder, a die block and holder located vertically above the shear and a shield extending over the top of the shear holder as and for the purpose specified.

20. The combination with the sided way, of a front former provided with a recess, the sides of the recess extending perpendicularly from the sides of the former and terminating in a semi-nut shape form adapted to form a receptacle to receive the nut after being struck out, and a side former adapted to form the remaining portion of the receptacle to receive the nut and means for moving the side former into the recess of the front former between the sides of the recess perpendicular to the sides of the front former so as to complete the nut with the semi-nut shape portion of the front former recess, as and for the purpose specified.

21. The combination with the sided way, of a front former and a holder for the front former provided with a slot, suitable guide-ways therefor on the bed, a lever extending through the slot in the holder and fulcrumed at the bottom on the frame, a lever arm secured on a counter shaft, a pitman connecting the lever extending through the holder with the aforesaid lever arm, a roller adjustably held in the upper end of the lever arm, a plate adjustably held on the lever arm and cams on the main shaft co-acting with the aforesaid rollers as and for the purpose specified.

22. The combination with the former, the holder for the side former and the guide-ways therefor, of a lever fulcrumed at the bottom of the frame, links connecting the upper end of the lever to the holder of the side former, a roller at the upper end of the lever, an extension frame secured to the lever and carrying a roller, a side shaft and cam on the side shaft co-acting with the aforesaid rollers as and for the purpose specified.

23. The combination with the side former, and the holder for the side former and the guide-ways therefor, of a lever fulcrumed at the bottom on the frame, links connecting the upper end of the lever to the holder of the side former, a roller at the upper end of the lever, an extension frame secured to the lever and carrying a roller, a side shaft and cam on the side shaft co-acting with the aforesaid rollers, and a pin extending laterally from the cam as and for the purpose specified.

24. The combination with the movable front and side formers provided with side and end recesses, of the punch, means for moving the formers toward the punch to bring the nut thereto, a holder for the punch, a standard carrying guide-ways in which the holder moves, a dead former coöperating with the other formers and a die block and holder therefor with which the punch co-acts as and for the purpose specified.

25. The combination with the movable front and side formers provided with side and end recesses, of the punch, means for moving the formers toward the punch to bring the nut thereto, a holder for the punch, a standard carrying guide-ways in which the holder moves, a dead former coöperating with the movable formers, and a die block and holder therefor with which the punch co-acts and a stripper located on the dead former above the die block as and for the purpose specified.

26. The combination with the front former provided with a recess to receive the nut when being punched and means for throwing the front former forwardly, a punch and die block, of a chute disposed to the rear of the die block, and means for freeing the nut from the recess in the front former upon such recess reaching the position over the chute as and for the purpose specified.

27. The combination with the front former provided with a recess to receive the nut when being punched and means for throwing the front former forwardly, a punch and die block, of a chute disposed to the rear of the die block, a kicker comprising an arm, a rock shaft for the arm, said arm having the end broadened, so as to insure contact with the nut when the kicker is operated, and means for operating the kicker as and for the purpose specified.

28. The combination with the front former provided with a recess to receive the nut when being punched and means for throwing the front former forwardly, a punch and die block, of a chute disposed to the rear of the die block, a kicker comprising an arm, a rock shaft supporting the arm, said arm having the end broadened, so as to insure contact with the nut when the kicker is operated, an arm secured on the opposite end of the rock shaft and provided with an enlarged inwardly projecting end and a spring holding the arm in the normal position and a pin on the fly wheel designed to operate on the enlarged end as and for the purpose specified.

29. The combination with the punch and means for operating the same, of the reciprocating front and side formers, the dead or stationary side former located opposite to the reciprocating side former and the back former suitably driven as and for the purpose specified.

30. The combination with the punch and holder therefor and the slide and standard on which the slide moves provided with an opening and a roller at the bottom of the opening and a slide block at the top having an arc-shaped recess, of a lever suitably fulcrumed on the standard on the frame and provided with a block having an arc shaped top fitting in the recess of said slide and means for operating the lever as and for the purpose specified.

31. The combination with the punch and holder therefor and the slide and standard on which the slide moves provided with an opening and a roller at the bottom of the opening and a slide block at the top having an arc-shaped recess, of a lever suitably fulcrumed on the standard on the frame and provided with a block having an arc shaped top fitting in the recess of said slide, a cam on the main shaft, a link pivoted on the frame and connected by an arm to the lever, a pin extending from the cam and co-acting with the link and a roller located in a suitable holder attached to the lever and co-acting with the cam as and for the purpose specified.

32. The combination with a shear and shear holder held in suitable guide-ways and having a back plate spaced from the shear, of an inclined chute formed between the shear and the back plate of the holder as and for the purpose specified.

33. A nut making machine comprising a bed plate having a sided feed way therein, means in said way for sizing the bar on four sides, means beyond the sizing means for feeding the bar, a combined shearing and crowning means in the path of the bar, a punch, and means for moving the nut from the shearing and crowning means to the punch while shaping the nut.

34. A nut making machine comprising a bed plate having a sided feed way therein, means in said way for sizing the bar on four sides, means beyond the sizing means for feeding the bar, a combined shearing and crowning means in the path of the bar, a punch, means for moving the nut from the shearing and crowning means to the punch while shaping the nut, and means for delivering the refuse and nut separately from the machine.

FREDERICK KELLY.

Witnesses:
B. BOYD,
R. COBAIN.

Copies of this patent may be obtained for five cents each, by addressing the "Commissioner of Patents, Washington, D. C."